UNITED STATES PATENT OFFICE.

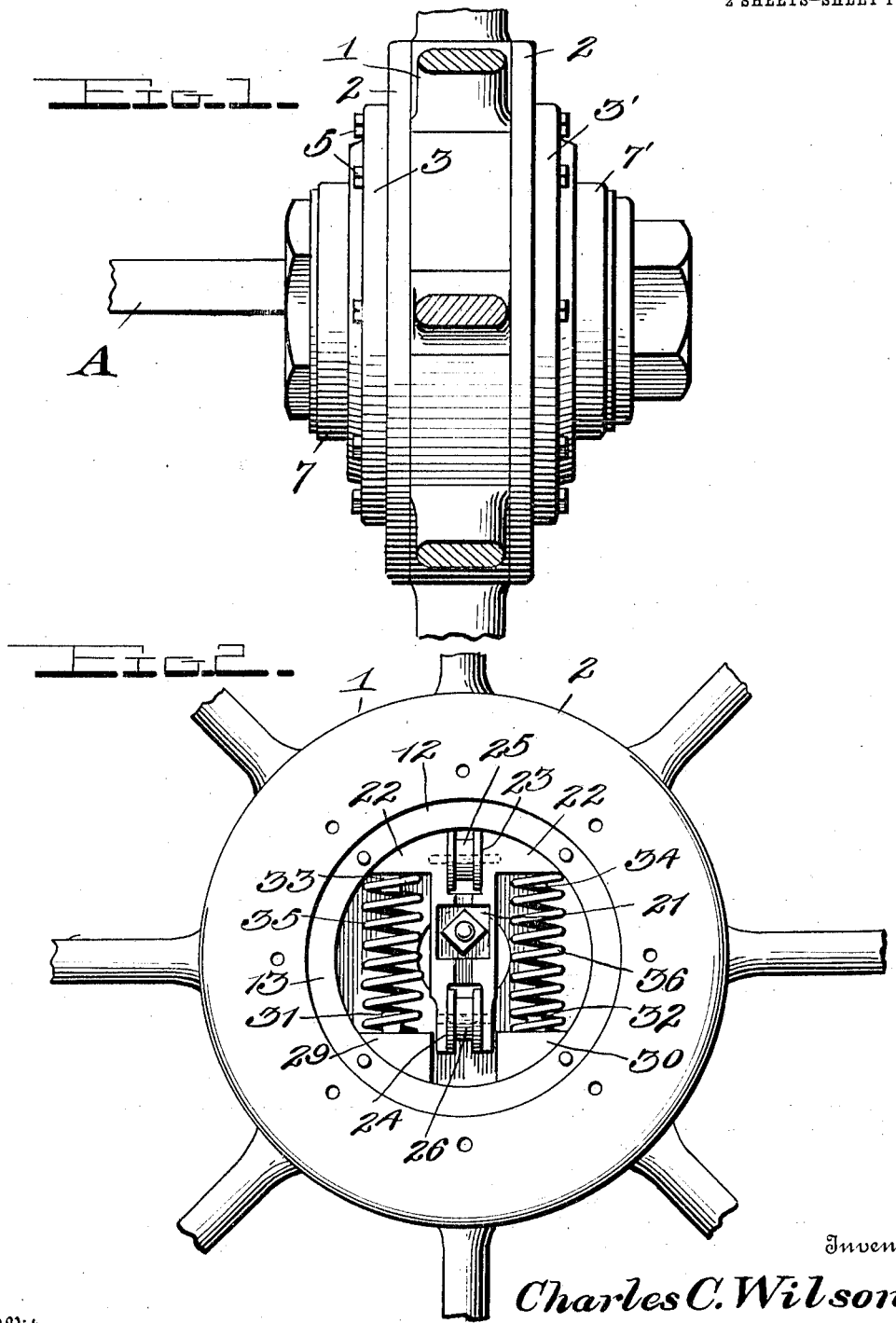

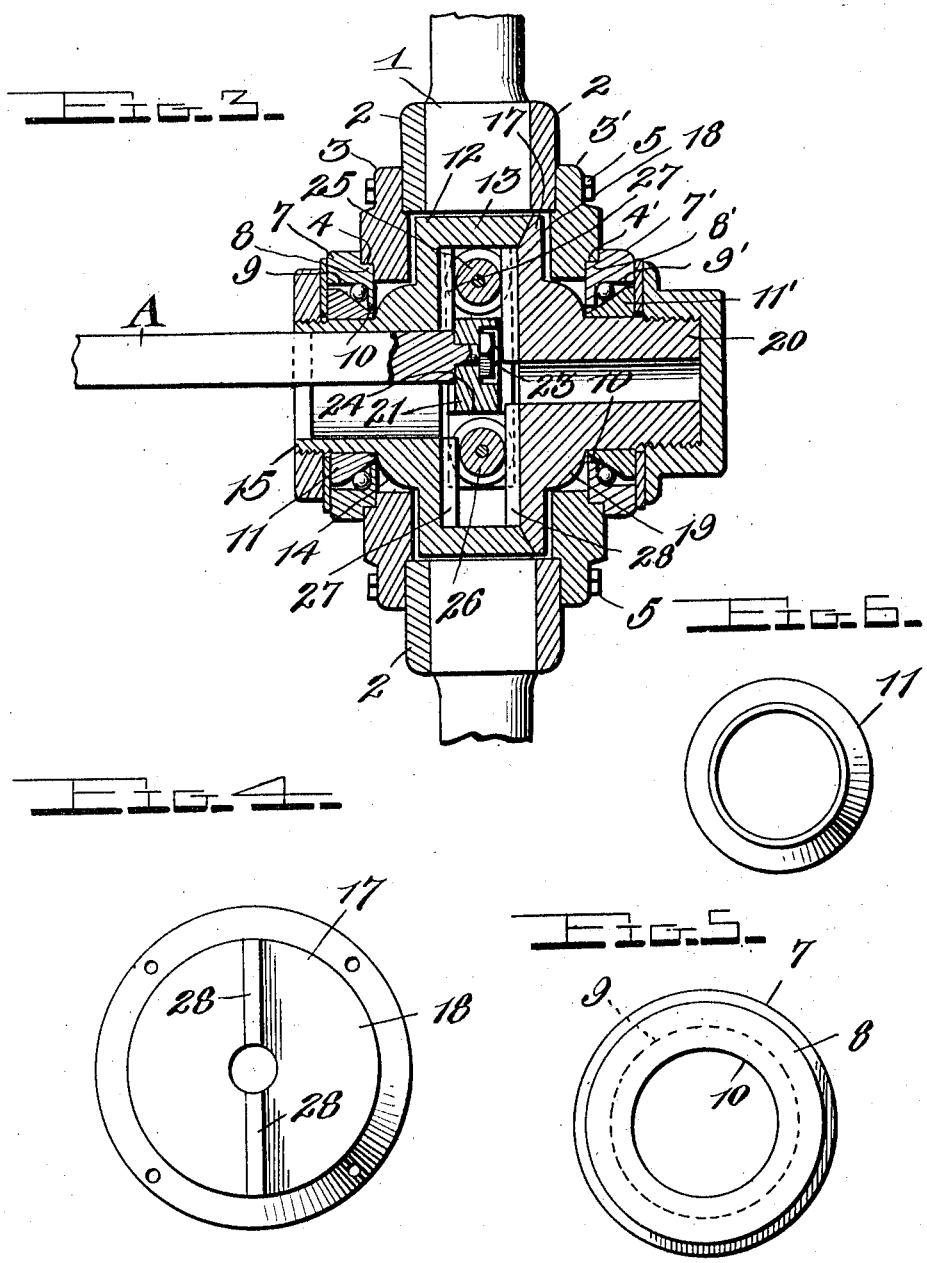

CHARLES CLEAVLAND WILSON, OF GREENVILLE, SOUTH CAROLINA.

HUB.

1,048,252.

Specification of Letters Patent.

Patented Dec. 24, 1912.

Application filed August 16, 1911. Serial No. 644,329.

*To all whom it may concern:*

Be it known that I, CHARLES C. WILSON, a citizen of the United States, residing at Greenville, in the county of Greenville and State of South Carolina, have invented certain new and useful Improvements in Hubs, of which the following is a specification, reference being had to the accompanying drawings.

This invention relates to resilient wheels and more particularly to a resilient hub for automobiles having solid rubber tires.

The object of this invention is to provide within the hub of the wheel in question, means whereby the jar will be taken up resiliently as the wheel runs over rough places.

Another object of this invention is to have the parts of the same readily accessible for inspection and repair whenever the same is desirable.

Other objects of this invention will become apparent as it is more fully set forth.

In the accompanying drawings which illustrate by way of example an embodiment of this invention, Figure 1 represents a view in elevation of a hub embodying this invention. Fig. 2 is an interior view of the hub. Fig. 3 is a central sectional view through the hub; and Figs. 4, 5 and 6 are details of various parts of the hub.

Similar reference characters refer to similar parts throughout the drawings.

In the construction shown in the drawings, 1 represents the hub which is provided with a hub proper 2. The hub 2 consists of two annular rings arranged to receive and hold between them, the spokes of the wheel. A pair of outer coverings 3 and 3', which are of relatively small diameter, are provided with grooves 4 and 4' in their outer portions, as is clearly indicated in Fig. 3. These coverings are secured to the hub proper 2, by means of bolts 5.

Disposed on the last mentioned coverings are rings 7 and 7' having their inner portions 8 and 8' diminished in diameter, in order to readily fit within the grooves 4 and 4', and are also provided with grooves 9 and 9' within them, as is clearly shown in the drawings. These rings are provided with holes 10 and 10' within them, which are of sufficient diameter to readily receive a pair of cones 11 and 11'.

The cones 11 and 11' are disposed within the last mentioned rings and run on ball- bearings inserted in the grooves 9 and 9'. Disposed within the above parts is a skein or spindle 12, that is arranged to hold the resilient means proper of this device, and consists of a cup-shaped member 13, that has a rounded raised portion 14, and from which extends a cylindrical threaded portion 15, as is clearly shown in the drawings. This skein is provided with an enlarged hole therethrough, in order to enable the axle to reciprocate vertically therein, and be properly guided by the sides thereof.

A cover 17 has its inner surface 18 planed smooth and beveled as is clearly shown in the drawings, and is provided with a hole centrally therein. The raised and threaded portions 19 and 20 are provided on the cover 17 and are similar to the parts 14 and 15 referred to. The cover 17 is secured to the skein 12 in any suitable manner. Secured to the end portion of the axle and arranged to reciprocate vertically within the casing 12, is a T-shaped member 21 that has its upper portion provided with arms 22, that are shaped so as to conform with the upper portion of the casing with which they come in contact. Slots 23 and 24 are provided within the T-shaped member to receive wheels 25 and 26, which are arranged to run on vertically extending rails 27 and 28, that are disposed on the skein 12 and cover 17. These wheels 25 and 26 are provided with flanges by which they are kept in proper relation with the rails. The opposite faces of the T-shaped member are provided with vertically extending grooves which communicate with the slots 23 and 24 and in which are adapted to operate on the rails 27 and 28 respectively. By this means the movement of the T-shaped member is made practically frictionless. In the bottom portion of the skein are provided a pair of blocks 29 and 30 between which the leg of the T-shaped member projects, and thus serve as a guide for the same. These blocks and also the lower portion of the arms 22 are provided with bosses 31, 32, 33 and 34, around which are disposed the end portions of springs 35 and 36, which normally tend to keep the T-shaped member toward the upper portion of the skein, as is clearly shown in the drawings.

When the hub is applied to the wheel of the vehicle, it is normally disposed so that the T-shaped member is disposed in the position shown in Fig. 2. As the wheel is jarred, the springs 35 and 36, will compress and give a resilient action to the axle of the vehicle.

It will be noted that the wheels 25 and 26 rolling on the rails 27 and 28 will give a frictionless movement to the T-shaped member, and at the same time serve to prevent any deviation from the proper line of movement. It is, of course, understood that the springs used in this device may be varied to suit the particular vehicle for which the hub is to be used; and also that they can be varied in number to suit the conditions arising.

By reason of the inner position of the T-shaped member and springs and other parts of the hub, connected thereto, within the hub, it is practically impossible for the same to be affected by moisture or dust, and at the same time the various parts of the whole hub are readily removable from each other and permit the inspection of any part of it.

Having thus described this invention, what is claimed is:—

1. In a device of the class described, a resilient skein having guides therein, an upwardly convex member reciprocable in said skein, rollers secured to said member and arranged to travel on said guides, flanges on said guides for keeping the same in proper relation on said guides, resilient means interposed between said member and said skein, and means for securing an axle to said member.

2. In a device of the class described, a resilient skein comprising separable elements having rails thereon, a member reciprocatable in said skein, arms disposed at right angles to the upper portion of said member, the upper portion of said arms being adapted to engage with the element of the skein adjacent thereto, and to make contact therewith for their whole length when in their uppermost position, rollers secured to said member and arranged to travel on said rails, flanges on said rollers for keeping the same in proper relation on said rails, resilient means interposed between said member and said skein, and means for securing an axle to said member.

3. In a device of the class described, a resilient skein comprising separable elements having rails centrally disposed thereon, a vertically disposed member reciprocatable in said skein and having arms extending from its uppermost portion at right angles thereto, the uppermost surface of said arms being curved so as to make relatively large contact with the element of the skein with which the same comes in contact when in its uppermost position, said member being provided with a plurality of slots therein, flanged rollers disposed in said slots and secured to said member and adapted to travel on said rails and be guided thereby, a plurality of blocks secured to said skein and disposed under the arms of said member, a plurality of bosses projecting from said arms and said blocks, resilient means interposed between said arms and blocks, said resilient means being held in place by said bosses, and means for securing an axle to said member.

4. In a device of the class described, the combination of a skein provided with an enlarged cup-shaped portion, a cover secured to the outer end of said enlarged cup-shaped portion, a T-shaped member mounted for reciprocation in said skein, vertically extending rails mounted on the inner face of said skein and cover, the opposite faces of said T-shaped member having vertically extending grooves therein for receiving said rails, flanged rollers mounted within the opposite extremities of said T-shaped member and in alinement with said grooves, the said rollers adapted to travel upon said rails and the coil springs mounted between the upper end of said T-shaped member and the inner periphery of the cup shaped portion of the skein substantially as described.

In testimony whereof I hereunto affix my signature in the presence of two witnesses.

CHARLES CLEAVLAND WILSON.

Witnesses:
W. F. WILSON,
T. C. TINDALL.

---

Copies of this patent may be obtained for five cents each, by addressing the "Commissioner of Patents, Washington, D. C."